United States Patent
Kusumoto

(10) Patent No.: US 6,765,742 B2
(45) Date of Patent: Jul. 20, 2004

(54) DISK STORAGE APPARATUS AND HEAD LOAD CONTROL METHOD

(75) Inventor: Tatsuharu Kusumoto, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 392 days.

(21) Appl. No.: 09/814,127

(22) Filed: Mar. 22, 2001

(65) Prior Publication Data

US 2001/0026415 A1 Oct. 4, 2001

(30) Foreign Application Priority Data

Mar. 23, 2000 (JP) .................................... P2000-082851

(51) Int. Cl.[7] .............................................. G11B 21/02
(52) U.S. Cl. ....................................................... 360/75
(58) Field of Search ............................... 360/75, 78.04; 318/563, 561, 280, 678

(56) References Cited

U.S. PATENT DOCUMENTS

| 5,615,064 | A | * | 3/1997 | Blank et al. .................. 360/75 |
| 5,781,363 | A | * | 7/1998 | Rowan et al. ........... 360/78.09 |
| 5,969,899 | A | * | 10/1999 | Utenick et al. .......... 360/78.04 |
| 5,982,130 | A | * | 11/1999 | Male .......................... 318/615 |
| 6,081,400 | A | * | 6/2000 | Lu et al. ....................... 360/75 |
| 6,108,157 | A | * | 8/2000 | Yoneda et al. ................ 360/75 |
| 6,204,629 | B1 | * | 3/2001 | Rote et al. .................. 318/803 |
| 6,320,717 | B1 | * | 11/2001 | Feng ............................ 360/75 |
| 6,567,232 | B1 | * | 5/2003 | Klaassen ...................... 360/75 |
| 6,590,731 | B1 | * | 7/2003 | Pan et al. ..................... 360/75 |

FOREIGN PATENT DOCUMENTS

| JP | 6-85264 | 10/1994 |
| JP | 11-25626 | 1/1999 |

* cited by examiner

Primary Examiner—David Hudspeth
Assistant Examiner—K. Wong
(74) Attorney, Agent, or Firm—Finnegan, Henderson, Farabow, Garrett & Dunner, L.L.P.

(57) ABSTRACT

In a disk storage apparatus, a CPU (2) supplies control current of a rated maximum current value to a VCM (6) at the time a head is loaded onto a disk. When the head is stopped on the head stop member, the CPU (2) controls an additional drive circuit (12) to conduct re-try processing. The additional drive circuit (12) supplies to the VCM (6) a control current whose current value is added to the rated maximum current value.

23 Claims, 8 Drawing Sheets

DISK STORAGE APPARATUS AND HEAD LOAD CONTROL METHOD

BACKGROUND OF THE INVENTION

1. Field of the Invention

The present invention relates to a disk storage apparatus which specifically uses a low voltage power supply and has a head load and unload mechanism.

2. Description of the Related Art

Recently, a disk storage apparatus (disk drive) and, more specifically, a small sized hard disk drive is becoming more popular as an external storage apparatus of a personal computer, and also as a data storage apparatus of all kinds of digital devices. Small sized digital devices such as mobile information devices, including note book and note pad type personal computers, are different from stationary type computers such as desktop-type ones, or portable-types in that they are used in circumstances under which they are easily affected by external vibration or impact. Further, as the power supply for their operation, a low voltage power supply (for example, a 3.3 V power supply) is coming into common use.

In a small sized disk drive used for such small sized digital devices, countermeasures to vibration and impact, and reduction of power consumption are important design factors for making these products. As countermeasures to vibration and impact, a head load/unload mechanism and a magnet latch mechanism have been adopted. The head load/unload mechanism moves the head—at the time of non-operation such as during power shutdown—to a head stop member (also called parking member, or ramp parking member) positioned outside the range of the disk. The head load/unload mechanism then stops the head at a parking area on the stop member. This operation is called the unload operation or retract operation. Further, when the drive is started, the head is moved from the head stop member onto the disk. This operation is called the load operation.

In the disk drive, there is an actuator on which the head (a slider equipped with a read/write element) is mounted. The actuator is a mechanism which is rotationally driven between the position of the head stop member to a position on the inner periphery of the disk, along the diameter of the disk. Further, the actuator is driven by the driving force of a voice coil motor (VCM).

The magnet latch mechanism is a mechanism by which, at the time the head is subject to an unload operation, the latch plate attached to the VCM coil (drive section of the motor) is attracted by using the magnetic force of the magnet of the VCM, thereby latching the VCM coil. By this mechanism, the actuator is latched and the head can be held at the parking area. When in the parking area, the actuator comes into contact with a rubber member which is called the external-periphery-side stopper, thereby regulating the movement of the actuator toward the outside direction of the disk.

As described above, in small sized disk drives a strong mechanism for reducing the vibration or the impact is required as an important design consideration (in addition to reducing the power consumption). The mechanism to which both of the head load/unload mechanism, and the magnet latch mechanism, are associated, is the mechanism which counteracts the vibration or the impact.

Incidentally, when the magnet latch mechanism is used and the actuator motor (the VCM coil) is latched, a sufficient latch force is desirable in order to securely hold the head in the parking area to even during vibration and impact. On the one hand, because the power voltage level is decreased to reduce power consumption, the driving force (the VCM torque) of the VCM is relatively lowered. Accordingly, when the latch force (magnetic force of the magnet) of the latch mechanism is too strong, the latch of the VCM can not always be released at the start of the load operation.

Further, the movement of the actuator is limited by the outer periphery side stopper which is made of rubber material. However, the rubber material deteriorates with age, and the actuator thus sometimes is stuck on the deteriorated rubber. Further, it has also been confirmed that, changing the circumferential temperature lowers the VCM torque of the VCM below the rated one.

When the situation as described above occurs, even when the rated control current flows into the VCM at the time of the load operation, the actuator is not driven. Accordingly, the head can not be removed from the head stop member. That is, the head stop member has a continuously inclined surface (called a ramp) in the parking area which is a position at which the head stops. In the load operation, the actuator moves upward on the inclined surface. Depending on the condition (angle or shape) of the inclined surface, however, when the VCM torque falls below the rated amount, the driving force of the VCM becomes insufficient to move the actuator up the inclined surface, and there is a possibility that the actuator is stopped at a position on the inclined surface of the parking area.

SUMMARY OF THE INVENTION

Accordingly, an object of the present invention is to provide a disk storage apparatus, including a head load/unload mechanism and a latch mechanism, which is adapted for use with small sized disk drives of the low-voltage-power-supply type, and by which a stable load operation can be realized so that the head can be securely removed from a head stop member.

To achieve the above object, according to the present invention, there is provided a disk storage apparatus which includes a head load/unload mechanism, a latch mechanism, and which is adapted for use with the small sized disk drives of the low-voltage-power-supply type. The apparatus has a mechanism including a re-try processing operation which can be conducted when the head is stopped on the inclined surface in the parking area. In the re-try processing operation, the control current value is increased, and is supplied to the VCM when the control current of the rated current value (maximum current value) is supplied to the VCM and the load operation is started.

That is, the apparatus is provided with: a head stop member positioned at the outside of the disk, for maintaining the head in a stopped condition; an actuator mechanism for moving the head from the head stop member to the inner periphery of the disk by driving force of the voice coil motor (VCM); a motor drive control circuit having an additional power supply circuit by which a control current, whose current value is not smaller than the rated maximum current value, can be supplied to the VCM; and a control means for controlling the VCM, so that it is driven at a predetermined speed, by using the additional power supply circuit at predetermined conditions at the time of the load operation.

The predetermined conditions are when the speed of the VCM is monitored, a control current of the rated maximum current value is supplied, and the head is still stopped. In such the case, the control means uses the additional power supply circuit, supplies to the VCM a control current whose current value is added to the rated maximum current value, and conducts speed control of the VCM. The additional power supply circuit has a capacitor to accumulate the electric charge which is generated by stepping up the power supply voltage of the drive. Discharging the capacitor generates the additional current to be added to the control current.

With the above structure, even in the case of relatively low voltage power supply, the drive force (VCM torque) of the VCM can be temporarily increased. Accordingly, even when, for example, the actuator is attracted to the outer periphery side stopper, the head can be removed from the position of the head stop member. Further, even when the latch force of the latch mechanism is too strong, the actuator can be released. Further, even when the angle and shape of the inclined surface is sharp, the VCM can be driven with a force that ensures removal of the head from the position of the head stop member.

DETAILED DESCRIPTION OF THE PREFERRED EMBODIMENTS

Figure 1:
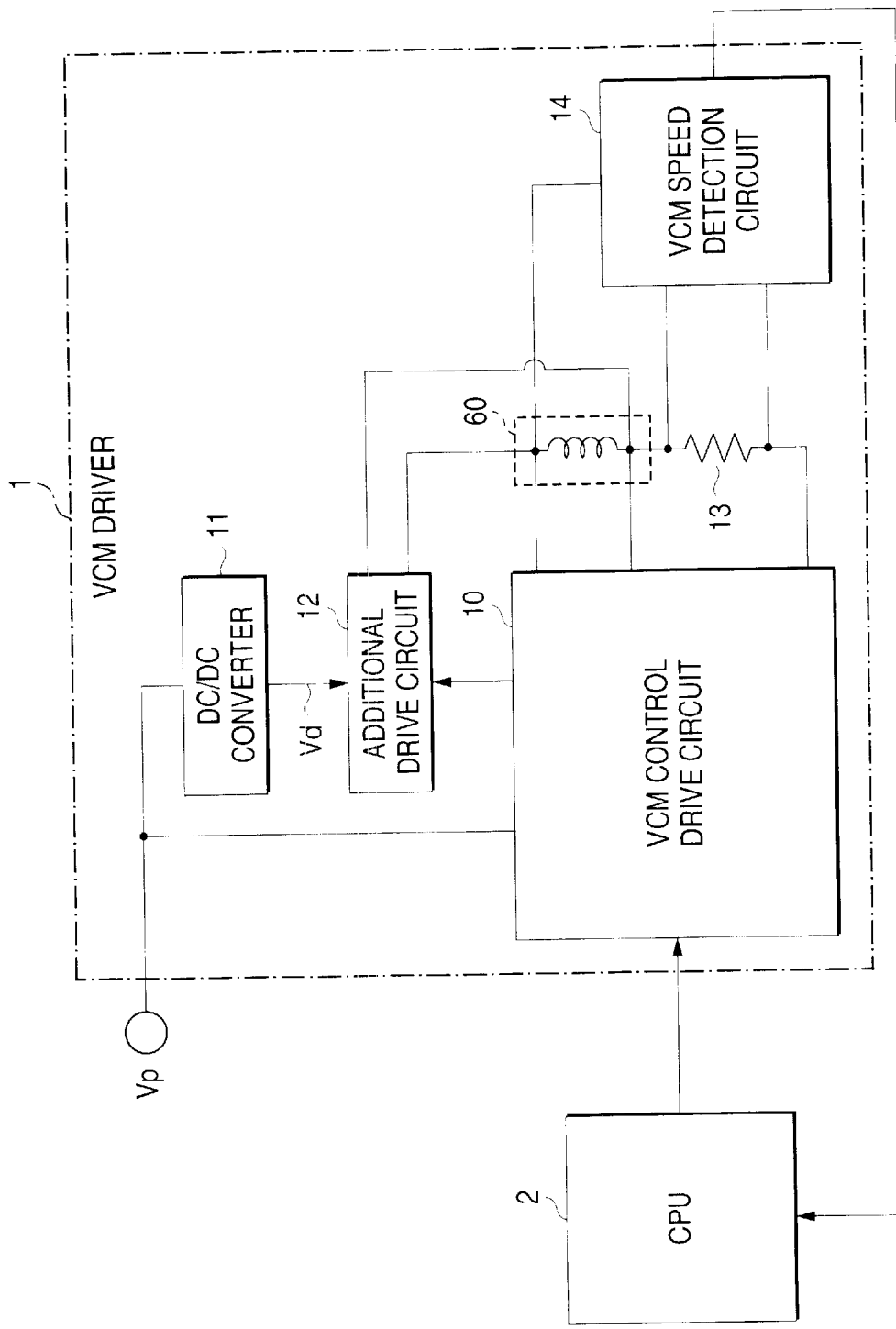
FIG. 1 is a block diagram showing a main portion of a VCM driver relating to the embodiment of the present invention.

Referring to the drawings, an embodiment of the present invention will be described below.
(The Structure of the Disk Drive)

Figure 5:
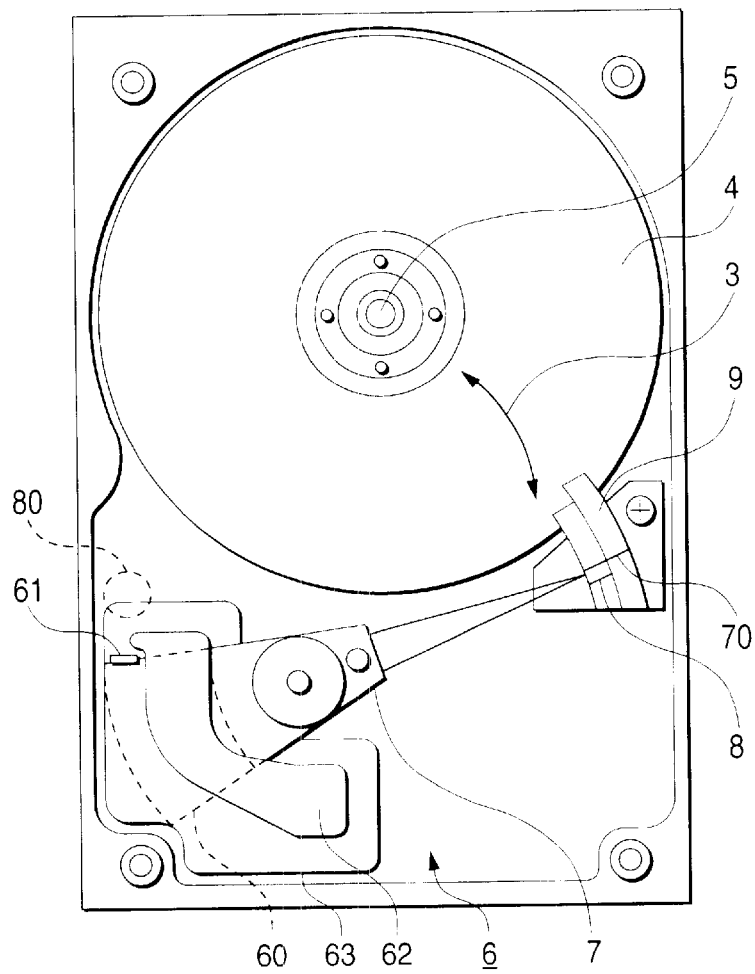
FIG. 5 is a view showing a main portion of a disk drive relating to the present embodiment.

The disk storage apparatus of an embodiment of the present invention, as shown in FIG. 5, is a small sized hard disk drive. The disk drive includes a disk 4 which is a data recording medium, a spindle motor (SPM) 5 to rotate the disk 4, a voice coil motor (VCM) 6 to move the actuator mechanism, an actuator 7 and a head 8. Further the disk drive includes a drive mechanism, which is called a head disk assembly, and a control system such as a microprocessor (CPU) or a VCM driver.

The head 8 is a slider equipped with a read head element (MR element: magnet resistive element) and a write head element (inductive type magnetic element). The head 8 is mounted on the top portion of the actuator 7 through a suspension. The actuator 7 is structured such that it moves between the inner periphery of the disk and the head stop member 9 in the diametrical (arrow 3) direction of the disk 4. The drive force of the VCM 6 moves the actuator 7. Further, a tab 70 to unload (park) the head 8 on the head stop member 9 is attached to the top portion of the actuator 7.

Figure 6:
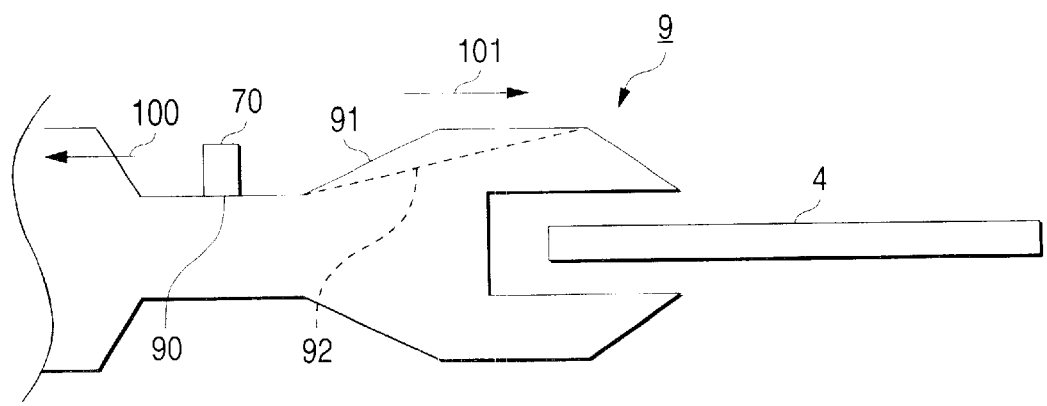
FIG. 6 is a view showing the structure of a head stop member relating to the present embodiment.

The head stop member 9 is a component included in the head load/unload mechanism and, as shown in FIG. 6, has a parking area 90 which holds the tab 70. The stop member 9 further has an inclined surface 91, and is a member to hold the head 8 outside the disk 4 through the tab 70. At the time of an unload operation, the tab 70 is supported by the parking area 90 which keeps the head 8 in the stop condition. Further, at the time of a load operation, along with the movement of the actuator 7, the tab 70 slides such that it moves upward on the inclined surface 91 from the parking area 90. Then, when the tab 70 is separated from the head stop member 9, the head 8 is loaded onto the disk 4.

Incidentally, according to the design specification of the disk drive, the inclined surface of the head stop member 9 may be that shown by dotted line (92) which shows an alternate shape or angle in FIG. 6.

The VCM 6 has a VCM coil (drive section) 60 connected to the actuator 7, a latch plate 61, a magnet 62, and a top yoke 63. In the present embodiment, the VCM 6 also includes a latch mechanism to latch the VCM coil 60, and thus the actuator 7, at the time of unload, by using the magnetic force of the magnet 62. The latch mechanism is a mechanism by which, according to the shape of the magnet 62, the latch plate 61 (attached to the end portion of the VCM coil 60) is attracted by the magnetic force of the magnet 62 to thereby latch the VCM coil 60. In this latched condition, the actuator 7 comes into contact with an outer-periphery-side stopper member 80 provided at a predetermined position, and the movement toward the outer periphery of the disk 4 is limited. The outer-periphery-side stopper member 80 is formed of rubber material.
(VCM Driver)

Figure 2:
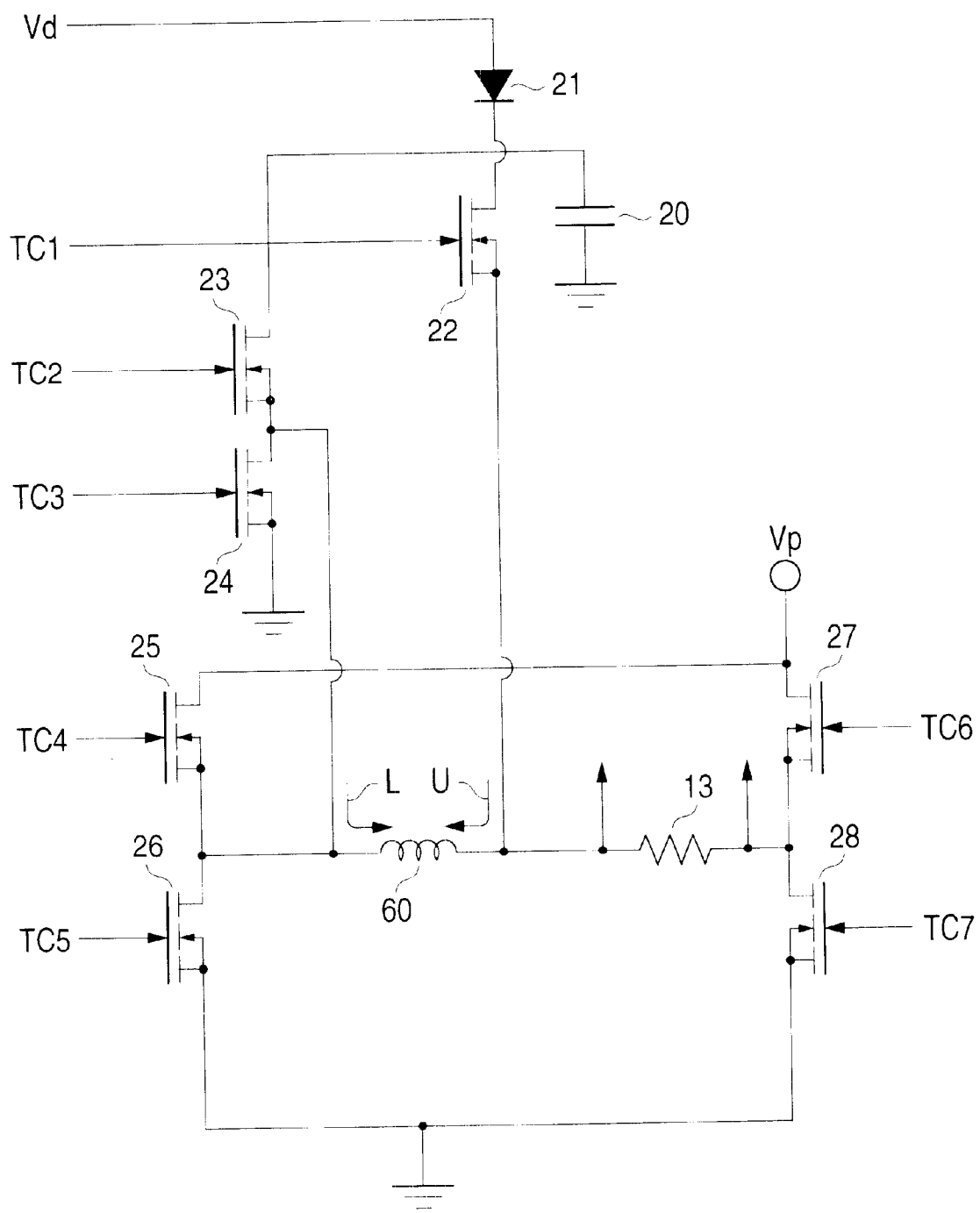
FIG. 2 is a circuit diagram showing a main portion of a VCM control drive circuit and an additional drive circuit, relating to the present embodiment.

FIGS. 1 and 2 are views relating to the VCM driver used for an embodiment of the HDD of the present invention. The VCM driver 1, as shown in FIG. 1, is the motor drive control circuit which supplies the control current to the VCM coil 60, according to the control of the CPU 2. Normally, the VCM driver 1 is an integrated circuit driver IC, together with the SPM driver which includes a drive control circuit for the SPM 5.

The CPU 2 is a main control unit of the disk drive which also is called also "micro controller". The CPU 2 controls the rotation of the disk 4, and controls the read/write operation other than the control of the actuator mechanism relating to the present invention. Additionally, the CPU 2 controls the VCM driver 1 and drives the actuator mechanism, at the time of the load operation by which the head 8 is loaded on the disk 4, and at the time of the unload operation by which the head 8 is moved from the disk 4 to the head stop member 9. Further, at a time of emergency such as power supply shutdown, when the head 8 is retracted from the disk 4 to the head stop member 9, normally, an exclusive-use retraction circuit (not shown) controls the VCM driver 1 to drive the actuator mechanism.

The VCM driver 1 has a DC/DC converter 11 relating to an embodiment of the present invention, and an additional drive circuit 12, other than the main VCM control drive circuit 10. The DC/DC converter 11 functions as a step-up circuit to generate a higher level voltage (hereinafter, it is called the step-up voltage Vd) than the power supply voltage Vp of the drive. The additional drive circuit 12 has a capacitor (20 in FIG. 2) to accumulate electric charges produced by the step-up voltage Vd supplied from the DC/DC converter 11. Further, during the load operation relating to an embodiment of the present invention, the capacitor 20 supplies the additional current by discharging to the VCM coil 60 (which will be described later).

Further, the VCM driver 1 has a current detection resistance 13 connected in serial with the VCM coil 60. The current detection resistance 13 is a member to monitor the value of the current flowing into the VCM coil 60 by a voltage value. The VCM control drive circuit 10 controls the control current value of the VCM 6, as indicated by the CPU 2, according to the monitoring voltage value.

Further, the VCM speed detection circuit 14 is a well-known circuit. It is structured, for example, by a plurality of operation amplifiers, detects the speed value of the VCM 6—according to the voltage value due to the back electromotive force of the VCM detected by the current detection resistance 13—and outputs the VCM's speed to the CPU 2.

FIG. 2 is a circuit diagram showing a main portion of the VCM control drive circuit 10 and the additional drive circuit 12. In FIG. 2, the control circuit to control each transistor is omitted for clarity.

The additional drive circuit 12 is structured by a capacitor 20 which functions as an additional power supply, a diode 21, and transistors 22, 23, and 24 as the main components. The capacitor 20 is always charged by the step-up voltage Vd supplied from the DC/DC converter 11. The diode 21 is an element to prevent the counter flow at the time of the shutdown of the driver's main power supply. On the other hand, the VCM control drive circuit 110 has transistors 25, 27 and 28 as the main elements, and controls the drive current to the VCM coil 60, which current corresponds to the main power supply voltage Vp.

(Load Control Operation)

Referring to a timing chart of FIG. 3 and a flow chart of FIG. 4, together with FIG. 1, FIGS. 5 and 6, the load control operation of the present embodiment will be described.

Initially, when the main power supply (voltage Vp) is turned on, during normal control by the CPU 2, the transistors 22 and 24 of the additional drive circuit 12 are always in the off condition. Accordingly, there is no current supply from the capacitor 20, which is the additional power supply, to the VCM 6. Herein, the normal control means the positioning control (seek control and track follow-up control) of the head 8 performed by the CPU 2.

The VCM control drive circuit 10 turns on the transistors 25 and 28 by the control signals TC4 and TC7 corresponding to the control of the CPU 2, and flows the control current of the direction L to the VCM coil 60. Accordingly, the actuator 7 moves from the outer-periphery-side of the disk 4 to the inner-periphery-side by the drive force of the VCM 6. On the other hand, the VCM control drive circuit 10 turns on the transistors 26 and 27 by the control signals TC5 and TC6 corresponding to the control of the CPU 2, and flows the control current of the direction U to the VCM coil 60. Accordingly, the actuator 7 moves from the inner periphery side of the disk 4 to the outer periphery side by the drive force of the VCM 6.

Under the normal control conditions as described above, the movement of the actuator 7 is controlled, and the head 8 is moved to an objective position on the disk 4 necessary for the read/write operation. Next, the load control operation relating to an embodiment of the present invention, will be described.

At the start of the load operation, the head 8 is in a condition in which it is stopped at the outside of the disk 4 as shown in FIG. 5. Specifically, the tab 70 attached to the actuator 7 is maintained in the stopped condition at the parking area 90 of the head stop member 9 as shown in FIG. 6. At this time, the actuator 7 is attracted in the outer-periphery-side direction (arrow 100) of the disk 4, and is in the condition in which it is brought into contact with the outer-periphery-side stopper 80.

Figure 3:
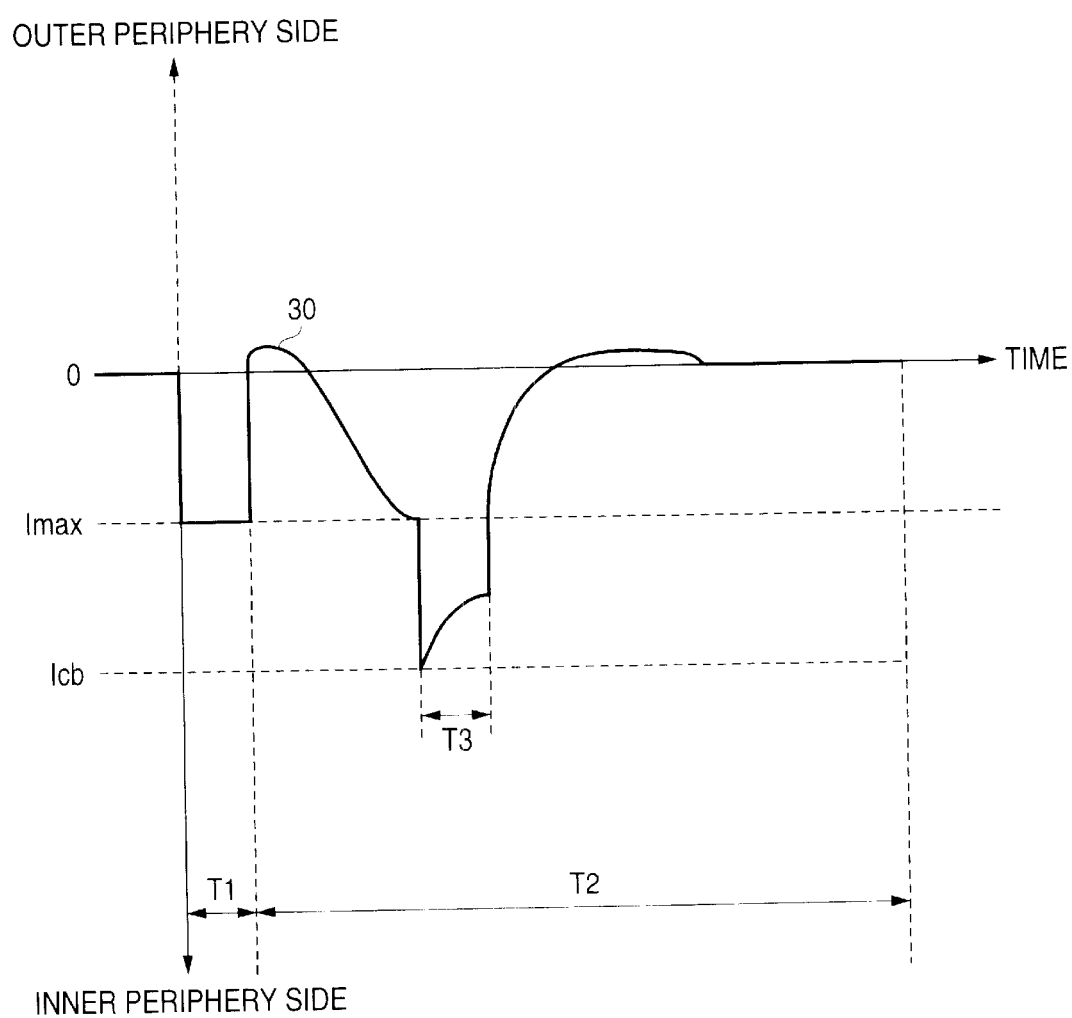
FIG. 3 is a timing chart for explaining a load control operation relating to the present invention.
Figure 4:
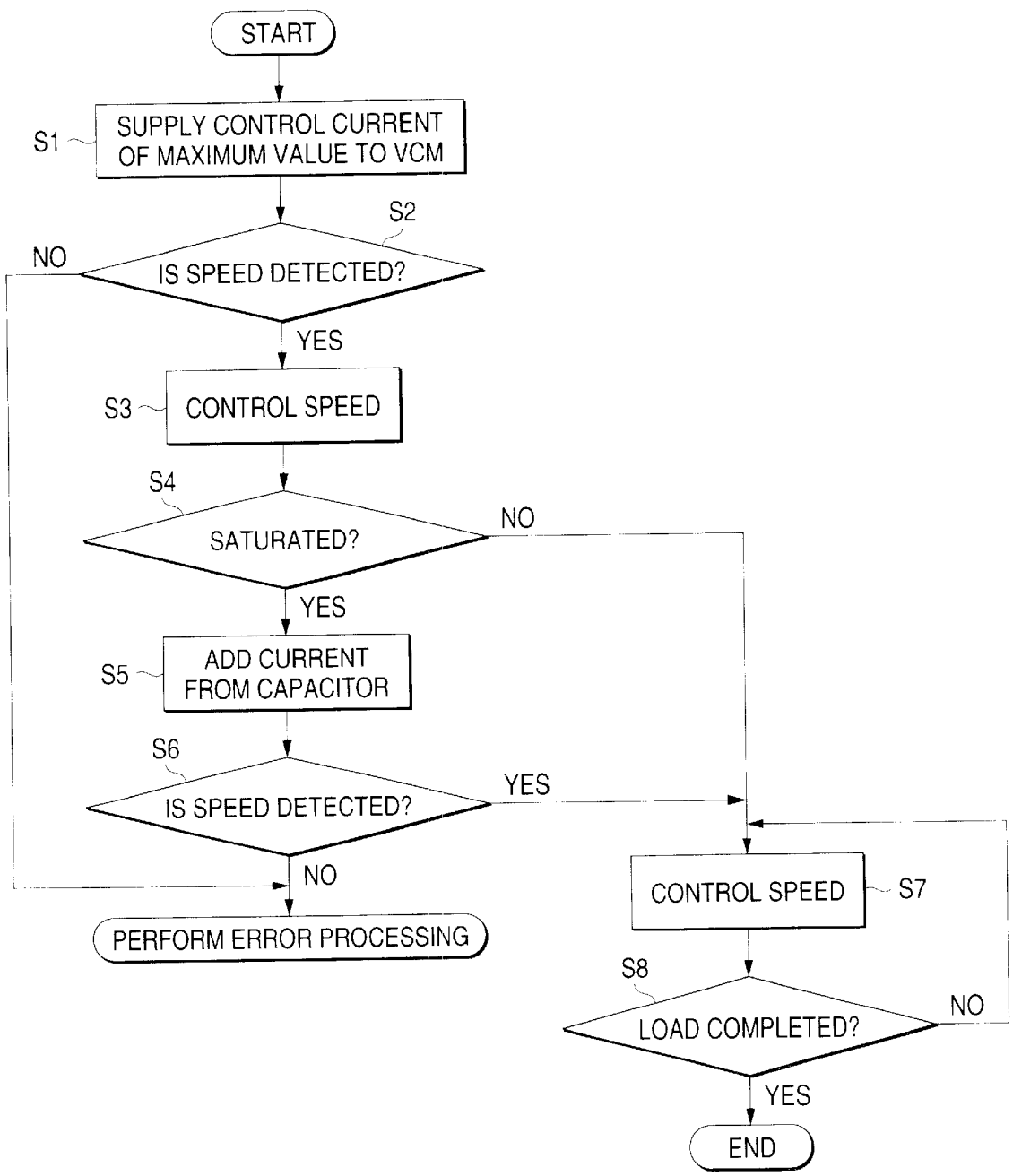
FIG. 4 is a flow chart for explaining the load control operation relating to the present embodiment.

The CPU controls the VCM control drive circuit 10 and, as shown in FIG. 3, supplies the control current 30 of the rated maximum current value (Imax) to the VCM 6 by using the power supply voltage (Vp) (step S1), during a predetermined period (T1) from the load start time. At this time, as described above, in the VCM control drive circuit 10, the transistors 25 and 28 are turned on by the control signals TC4 and TC7, and the control current of the direction L flows to the VCM coil 60. Thereby, the actuator 7 is moved toward the outer periphery of the disk 4 (i.e., in the load direction 101 shown in FIG. 6), by the drive force of the VCM 6.

The CPU 2, after the predetermined period (T1), conducts a speed control operation (feed back control) to control the speed of the VCM 6 (that is, movement speed of the actuator) by using the speed value detected by the VCM speed detection circuit 14 (steps S2 and S3). In this period (T2) of the speed control, even when the control current 30 of the rated maximum current value (Imax) is supplied to the VCM 6, if the VCM is not driven, i.e., a saturated condition occurs, the CPU 2 conducts the additional current control (period T3) by using the additional power supply circuit 12 (YES in step S4, S5). That is, when the CPU 2 judges that the head 8 (that is, the tab 70) is stopped at the inclined surface 91, according to the speed value from the VCM speed detection circuit 14, as shown in FIG. 6, the CPU 2 advances to the additional current control.

In the additional current control, as shown in FIG. 2, the CPU 2 turns on the transistors 22 and 24 of the additional drive circuit 12 by issuing control signals TC1 and TC3. Thereby, the circuit composed of the capacitor 20, transistor 22, VCM coil 60, transistor 24 and ground, is formed. That is, the additional current of the direction U flows through the VCM coil 60 due to the discharge of the capacitor 20. In the capacitor 20, because the electric charges are accumulated by the step-up voltage (Vd) which is generated by stepping up the power supply voltage (Vp), the additional current whose current value (Icb)—which is larger than the rated maximum current value (Imax), corresponding to the power supply voltage (Vp)—can be supplied to the VCM 6.

By such additional current control (period T3), a drive force (torque) which is larger than the rated value is supplied to the VCM 6 and, therefore, there is a great possibility that the head 8 (that is, tab 70) moves on the inclined surface 91. When the speed of the VCM 6 can be obtained, the CPU 2 re-starts the speed control, and continues it up to the load completion in which the head 8 is loaded on the disk 4 (steps S6, S7, and Yes in step S8).

As described above, even when the control current 30 of the rated maximum current value (Imax) is supplied to the VCM 6, and the VCM 6 still is not driven—that is, the head 8 is stopped at the position of the head stop member 9—the CPU 2 conducts the additional current control. That is, the additional current whose current value (Icb) is larger than the rated maximum current value (Imax) is supplied to the VCM 6 for a predetermined period (period T3 corresponding to the capacity of the capacitor). Thereby, the speed can be given to the VCM 6 and, as a result, the CPU 2 conducts the re-try processing of the load control (speed control), and can complete the load operation.

Accordingly, for example, even when the actuator 7 is attracted to the outer-periphery-side stopper 80 at the start of the load operation, the head 8 can be removed from its position on the head stop member 9. Further, even when the latch force of the latch mechanism is too strong, the latch of the actuator 7 can be released. Further, even when the condition (angle or shape) of the inclined surface of the head stop member 9 is sharp (92), a sufficient drive force of the VCM 6 ensures that the head 8 is removed from the head stop member 9.

(Another Load Control Operation)

Figure 10:
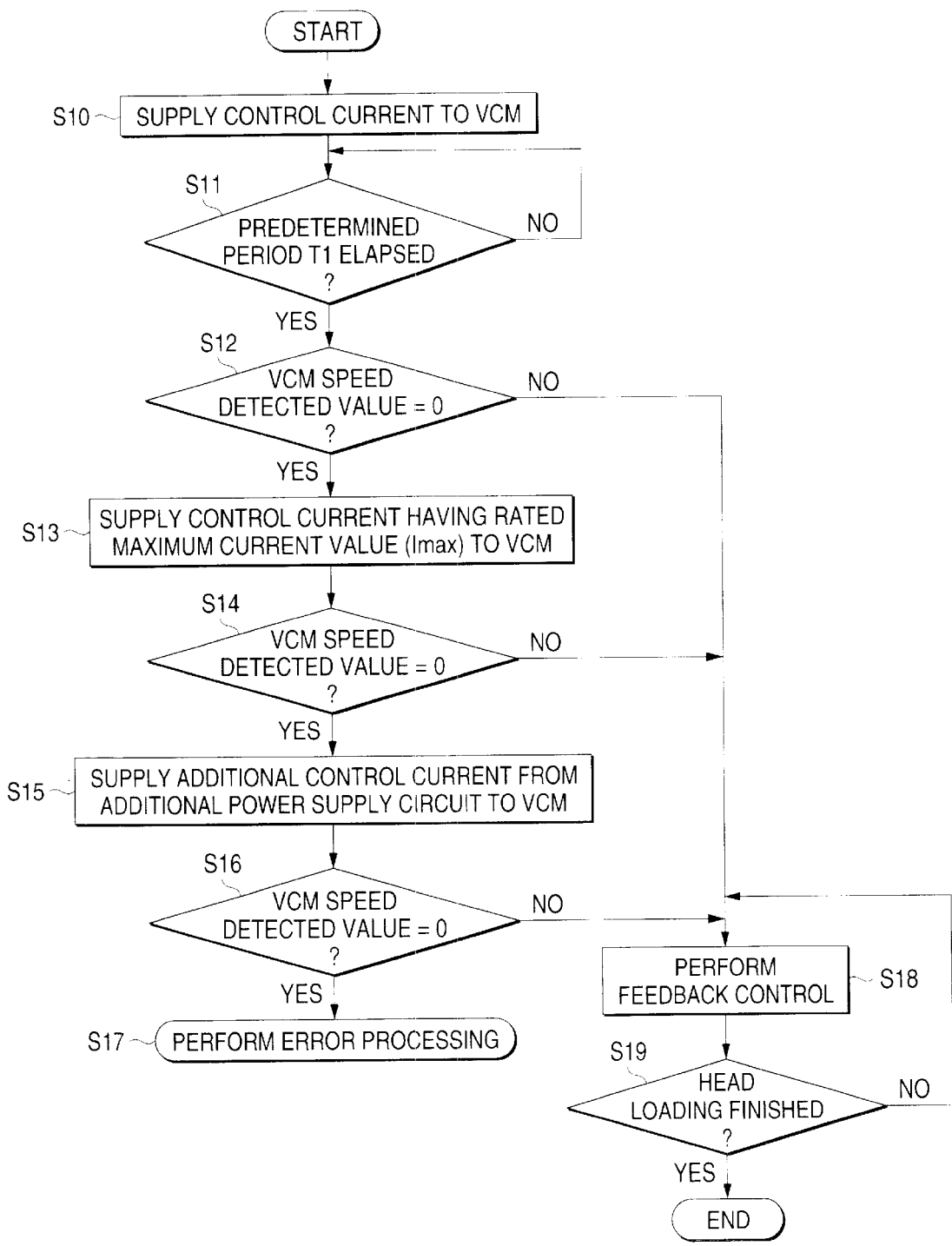
FIG. 10 is a flow chart for explaining another load control operation relating to the present embodiment.

FIG. 10 is a flow chart showing another load control operation according to the embodiment of the invention. Referring to the flowchart of FIG. 10, the load control operation will be described below.

First, in Step 10, according to the control from the CPU 2, the VCM control drive circuit outputs the control signal TC4 and TC7 to turn the transistors 25 and 28 on, thereby to supply the control current of the direction L to the VCM coil 60 by the power supply voltage. The supplement of the control current to the VCM coil 60 drives the actuator 7 to move the head from outer peripheral side to the inner periphery side of the disk 4.

In Step 11, the CPU 2 determines whether a predetermined period T1 has passed from the load start time.

In Step 12, after the predetermined period T1, the CPU 2 determines whether the speed of the VCM 6 is 0, using the speed value detected by the VCM speed detection circuit 14. If the speed of the VCM 6 is not 0, the CPU performs the feedback control of the speed of the VCM 6 based on the speed value form the VCM speed detection circuit 14 (Step 18). The feedback control continues until completion of the head loading (S19).

If the speed of the VCM 6 is 0, it is determined that the VCM 6 is not driven, namely the head 8 is not moved, and then the CPU controls the VCM control drive circuit to supply the control current having the rated maximum current value (Imax) to the VCM coil 60 (S13).

Then, the CPU 2 again determines whether the speed of the VCM 6 is 0, using the speed value detected by the VCM speed detection circuit 14. If the speed of the VCM 6 is not 0, the CPU performs the feedback control of the speed of the VCM 6 based on the speed value form the VCM speed detection circuit 14 in Step 18. The feedback control continues until completion of the head loading (S19).

However, if the speed of the VCM 6 is 0, it is again determined that the VCM 6 is not driven, namely the head 8 is not moved, and then the CPU 2 performs the supplement of the additional control current to the VCM coil 6 (Step 15).

In the supplement of the additional control current, as shown in FIG. 2, the CPU 2 outputs the control signals TC1 and TC3 to turn on the transistor 22 and 24 of the additional drive circuit 12, so that the circuit composed of the capacitor 20, transistor 22, VCM coil 60, transistor 24 and ground is formed. The circuit formed supplies to the VCM coil 60 the additional control current due to the discharge of the capacitor 20. In advance, the electric charges are accumulated in the capacitor 20 by the voltage Vd generated by stepping up the power supply voltage Vp. Therefore, the additional control current having the current value Icb larger than the rated maximum current value (Imax) can be supplied to the VCM coil 60.

Then, the CPU 2 again determines whether the speed of the VCM 6 is 0, using the speed value detected by the VCM speed detection circuit 14. If the speed of the VCM 6 is not 0, the CPU performs the feedback control of the speed of the VCM 6 based on the speed value form the VCM speed detection circuit 14 in Step 18. The feedback control continues until completion of the head loading (S19).

However, if the speed of the VCM 6 is 0, it is again determined that the VCM 6 is not driven, namely the head 8 is not moved. In such a case, the controller performs an error processing in Step 17.

As described above, in this load operation, the control current 30 having the rated maximum current value is supplied to the VCM coil 60 if the control current 30 does not drives the VCM 6 to move the head 8 after the predetermined period T1 has elapsed. And then, the additional control current having the current value (Icb) larger than the rated maximum current value (Imax) is supplied to the VCM coil 60 if the control current having the rated maximum current value does not drive the VCM 6 to move the head 8.

Therefore, even if the head 8 hardly moves from its start position, for example, even if the actuator 7 is attracted to the outer-periphery side stopper 80 at the load operation, the head can be removed from the position to perform the load operation of the head.

(The First Modified Example)

Figure 7A:
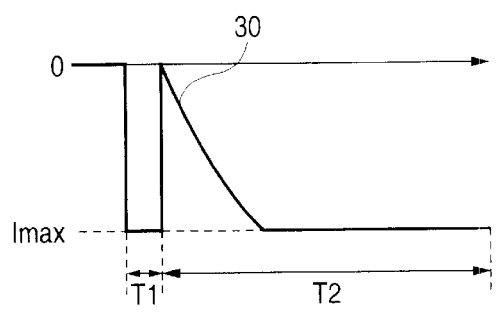
FIGS. 7A and 7B are timing charts for explaining the first modified example of the present embodiment.
Figure 7B:
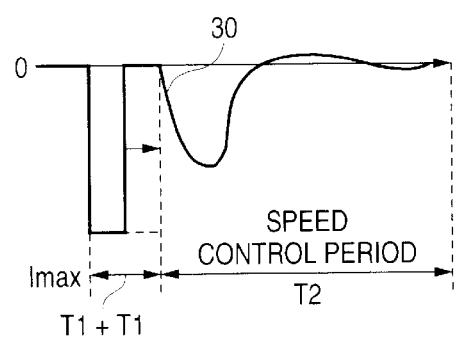

FIG. 7B is a view showing the first modified example of the present invention. In this embodiment, at the time of the load start, as shown in FIG. 7A, the CPU 2 supplies the control current 30 of the rated maximum current value (Imax) to the VCM 6 for the predetermined period (T1). Thereby, the actuator 7 is released from the magnet latch mechanism, and the initial speed is obtained. The CPU 2 can then advance to the speed control.

However, due to the above-noted factors, there is sometimes a case (including one wherein the actuator is attracted to the outer-periphery-side stopper 80) in which the latch condition of the actuator 7 can not be released. Accordingly, the CPU 2 extends the period to supply the control current 30 of the rated maximum current value (Imax) to the VCM 6 as shown in FIG. 7B. That is, the CPU 2 applies the maximum current value (Imax) over a time period of (T1+T1). In other words, the CPU 2 re-tries the processing to supply the control current of the rated maximum current value (Imax) to the VCM 6. Thereby, the latch condition of the actuator 7 can be released.

(The Second Modified Example)

Figure 8:
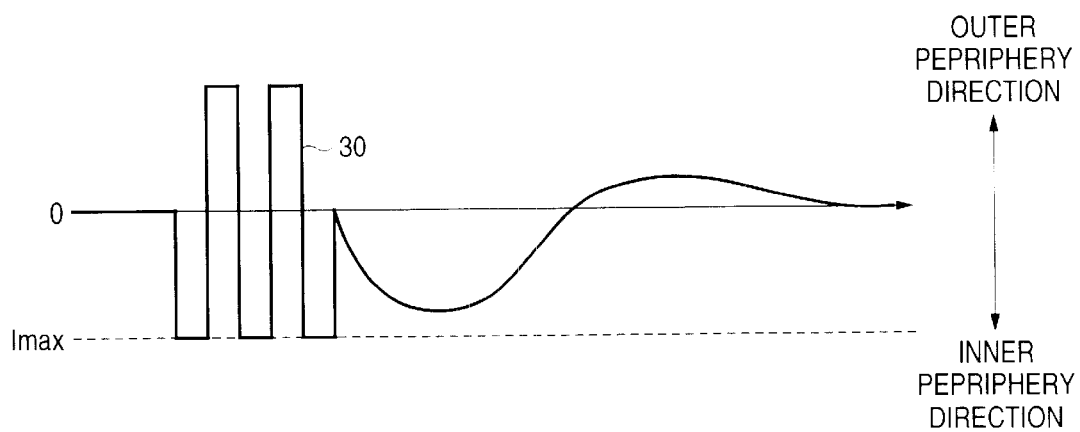
FIG. 8 is a timing chart for explaining the second modified example of the present embodiment.

FIG. 8 is a view showing a second modified embodiment of the present invention. In the second modified embodiment, even when the control current 30 of the rated maximum current value (Imax) is supplied to the VCM 6 for a predetermined period (T1), and the latch condition (including one wherein the actuator is attracted to the outer-periphery-side stopper 80) of the actuator 7 can not be released, the CPU 2 controls the current so as to oscillate the actuator 7 in the movement direction. Specifically, the CPU 2 switches the supply direction (L and U in FIG. 2) of the control current 30 of the rated maximum current value (Imax), and alternately switches the drive direction of the VCM 6 to the inner-periphery-side direction of the disk 4 and to the outer-periphery-side direction.

Therefore, by oscillating the actuator 7, which is attracted to the outer-periphery-side stopper 80, the actuator 7 can be moved so that the actuator 7 is separated from the outer-periphery-side stopper 80.

(Load Retry Sequence)

Figure 9:
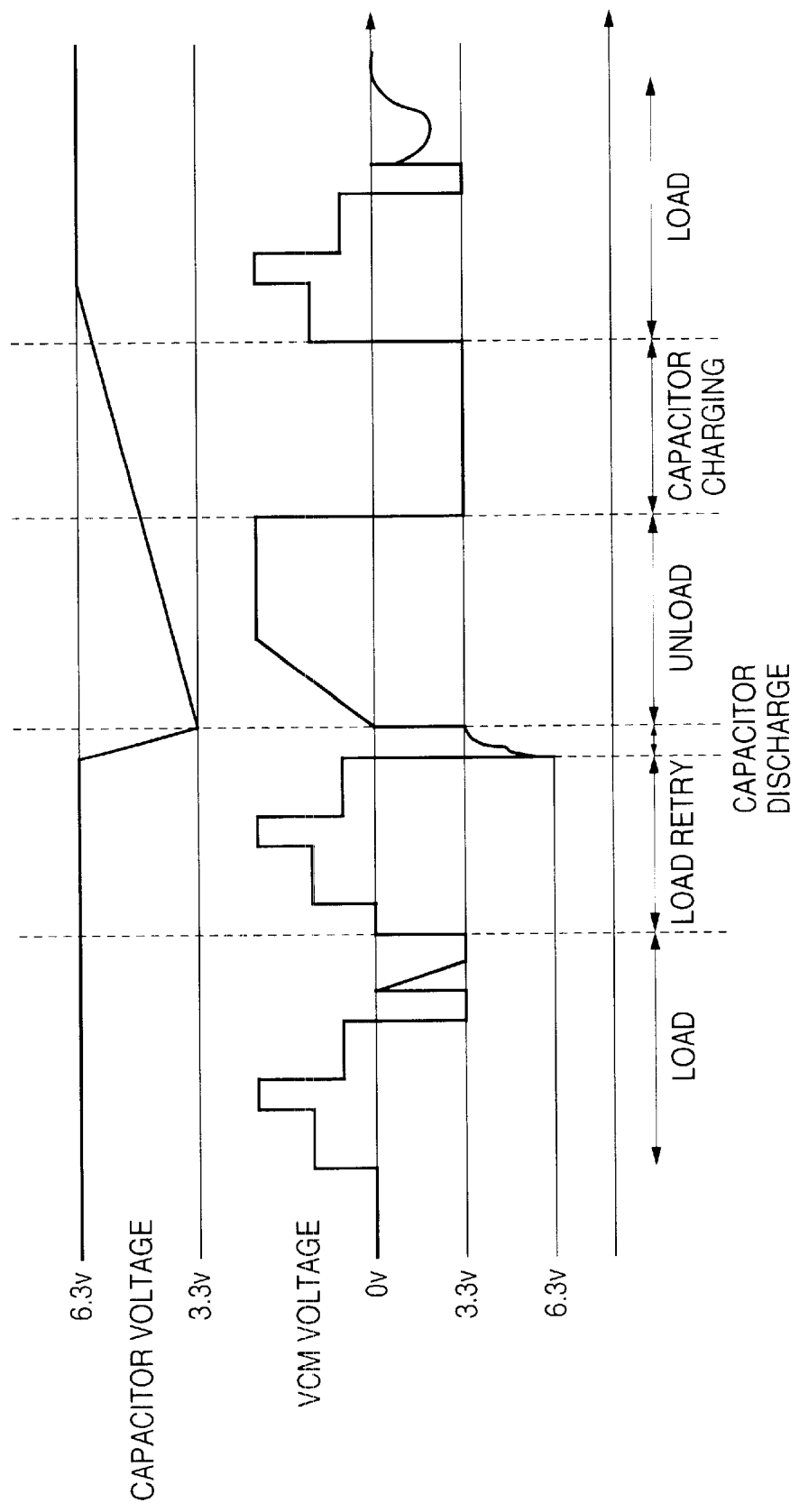
FIG. 9 is a timing chart showing a load retry sequence according to the present invention.

FIG. 9 is a timing chart showing a load retry sequence according to the present invention.

Referring to FIG. 9, if it is judged that the actuator 7 cannot escape from the magnet latch after the load operation starts, the operation is shifted to a load retry operation. During the load retry operation, charges stored in the capacitor 20 (see FIG. 2) are discharged so as to allow the actuator 7 to escape from the magnet latch state. Since the capacitor 20 is also employed for an emergency load operation, if the head 8 is moved toward the disk while the capacitor 20 is in a discharged state, there is a risk that the charge capacitance of the capacitor 20 is insufficient—at the time the power supply is cut off—to return the head 8 to the latch mechanism. To prevent this drawback, in the case where the capacitor 20 is employed to remove the actuator 7 from the magnet latch state, an unload operation is executed immediately after the actuator 7 has been released from the magnet latch state, thereby returning the head 8 to the latch mechanism. Thereafter, upon completion of charging the capacitor 20, a normal load operation is again conducted.

As described above, the present invention is effective especially when it is applied to small sized disk drives having a head load/unload mechanism, a latch mechanism, and a low voltage power supply requirement. Specifically, for example, at the start of the load operation to move the head onto the disk, even if the actuator still is attracted to the outer-periphery-side stopper when the drive force of the voice coil motor is temporarily increased, the re-try processing of the load control is conducted. Accordingly, the head is surely removed from the head stop member, and the load operation is completed, whereby, a stable load operation is realized.

What is claimed is:

1. A disk storage apparatus comprising:
    a head for recording data and reproducing data from a disk,
    a head stop member for maintaining the head in a stopped state;
    an actuator mechanism for holding the head;
    a voice coil motor for providing a driving force to the actuator to move the head from a position on the head stop member to an inner-periphery side of the disk;
    a motor drive control circuit including:
        a first power supply circuit for supplying a control current having a maximum rated value to the voice coil motor to control a driving operation of the voice coil motor, and
        a second power supply circuit for supplying to the voice coil motor an additional control current in addition to the control current; and
    a controller for detecting a head stop condition when the first power supply circuit supplies the control current to the voice coil motor at the maximum rated value, the controller controlling the second power supply circuit to add the additional control current from the second power supply circuit to the voice coil motor when the controller detects the head stop condition,
    wherein the head stop condition is that the head does not move from the head stop member when the first power supply circuit supplies to the voice coil motor the maximum rated value of the control current.

2. The disk storage apparatus according to claim 1, wherein the second power supply circuit comprises a capacitor charged by the first power supply circuit to generate the additional control current.

3. The disk storage apparatus according to claim 1, further comprising a speed detector for detecting a speed of the voice coil motor based on a voltage due to a back-electromotive force generated in the voice coil motor,
    wherein the controller judges a moving condition of the head according to the speed obtained from the speed detector; and
    according to the judgement result of the controller, unless the head moves, the controller controls the second power supply circuit to supply the additional control current to the voice coil motor.

4. The disk storage apparatus according to claim 1, wherein:
    the actuator mechanism includes a tab member disposed in the vicinity of the head;
    the head stop member defines an inclined portion and a parking portion supporting the tab member;
    at the time of an unload operation, the voice coil motor moves the actuator mechanism to the head stop member to stop the ta member at the parking portion; and
    at the time of a load operation, the voice coil motor slidably moves the tab member from the parking position upward along the inclined portion, so that the head is loaded onto the disk after the tab member leaves from the head stop member.

5. The disk storage apparatus according to claim 4, wherein, after the controller controls the second power supply circuit to supply the additional control current to the voice coil motor so that the head moves along the inclined portion from the parking portion, the first power supply circuit supplies the control current to the voice coil motor to move the head onto the disk when the second power supply circuit is in a condition for enabling the supplement of the additional control current.

6. The disk storage apparatus according to claim 1, wherein, unless the controller judges that the head moves after supplying the additional control current to the voice coil motor, the controller controls the control current for a predetermined time period to drive the voice coil motor so that the head alternately moves to an inner-periphery-side direction and an outer-periphery-side direction of the disk.

7. The disk storage apparatus according to claim 2 further comprising a speed detector for detecting a speed of the voice coil motor based on a voltage due to a back-electromotive force generated in the voice coil motor,
    wherein the controller judges a moving condition of the head according to the speed obtained from the speed detector, an
    according to the judgement result of the controller, unless the head moves, the controller controls the second power supply circuit to supply the additional control current to the voice coil motor.

8. The disk storage apparatus according to claim 2, wherein:
    the actuator mechanism includes a tab member disposed in the vicinity of the head;
    the head stop member defines an inclined portion and a parking portion supporting the tab member;
    at the time of an unload operation, the voice coil motor moves the actuator mechanism to the head stop member to stop the tab member at the parking portion; and
    at the time of a load operation, the tab member slidably moves from the parking portion upward along the inclined portion, and the head is loaded onto the disk after the tab member separates from the head stop member.

9. The disk storage apparatus according to claim 8, wherein, the controller controls the second power supply circuit to supply the additional control current to the voice coil motor so that the head moves along the inclined portion from the parking portion, the first power supply circuit supplies the control current to the voice coil motor to move the head onto the disk after the capacitor of the second power supply circuit is fully charged by the first power supply circuit.

10. A disk storage apparatus comprising:

a head for recording data onto or reproducing data from a disk, a head stop member positioned outside the disk, the head stop member maintaining the head in a stopped state;

an actuator mechanism holding the head;

a voice coil motor for providing a driving force to the actuator to move the head from a position on the head stop member to an inner-periphery side of the disk;

a motor drive control circuit for supplying a control current having a rated maximum value to the voice coil motor to control the driving operation of the voice coil motor;

a speed detector for detecting a speed of the voice coil motor according to a voltage value due to the back-electromotive force generated in the voice coil motor; and a controller for, at the time of a load operation to move the head from the head stop member onto the disk, controlling the motor drive control circuit to supply the control current of the rated maximum value to the voice coil motor for an initial predetermined time period, and for judging whether or not the head moves, wherein the supply period of the control current is extended unless the controller judges that the head moves according to the speed value obtained by the speed detector.

11. The disk storage apparatus according to claim 10, wherein, unless the controller judges that the head moves, the controller controls the control current for a predetermined time period to drive the voice coil motor so that the head alternately moves to an inner-periphery-side direction and an outer-periphery-side direction of the disk.

12. A disk storage apparatus comprising:

a head;

a head stop member maintaining the head in a stop position;

an actuator mechanism for holding the head, for which a driving force is provided from a voice coil motor to move the head from the stop position of the head stop member to an inner-periphery side of the disk;

a first drive circuit supplying a control current to the voice coil motor for driving the head;

a controller detecting a head stop condition when the first drive circuit supplies the control current to the voice coil motor; and a second drive circuit supplying an additional control current to the voice coil motor when the controller detects the head stop condition.

13. The disk storage apparatus as claimed in claim 12 further comprising a speed detection circuit detecting a head moving speed while the head moves on the head stop member;

wherein the controller detects the head stop condition or a head moving condition as a result of the head moving speed detected by the speed detection circuit.

14. The disk storage apparatus as claimed in claim 13, wherein the speed detection circuit detects the head moving speed while the head moves on an inclined portion formed on the head stop member.

15. A method of controlling a load of a head comprising the steps of:

supplying a control current to a motor to move the head onto a disk from a head stop position outside the disk;

judging whether or not the head moves; and if it is judged that the head does not move, supplying an additional control current, in addition to the control current, to the motor to move the head onto the disk.

16. The method according to claim 15, wherein the judging step comprises a step of detecting a moving speed of the head to judge the movement of the head.

17. The method according to claim 15, further comprising the steps of:

detecting a moving speed of the head; and controlling the moving speed of the head after the head moves.

18. The method according to claim 16, wherein the moving speed of the head is detected on the basis of a voltage value due to the back-electromotive force generated in the motor.

19. The method according to claim 15, wherein the head is temporarily fixed to a head stop member positioned outside the disk so that the head does not move.

20. The method according to claim 19, further comprising the step of:

moving the head between the disk and the head stop member after the additional control current is supplied to the motor;

charging an electric charge for supplying the additional control current; and moving the head onto the disk.

21. The method according to claim 15 further comprising the step of supplying the control current for a predetermined time period to drive the motor so that the head alternately moves to an inner-periphery-side direction and an outer-periphery-side direction of the disk.

22. A method of controlling a load of a head comprising the steps of:

supplying a control current to a motor for a predetermined time period to move the head onto a disk from a head stop position outside the disk;

judging whether or not the head moves after the predetermined time period elapses; and if it is judged that the head does not move, continuing to supply the control current to the motor.

23. The method according to claim 22 further comprising the step of supplying the control current for a predetermined time period to drive the motor so that the head alternately moves to an inner-periphery-side direction and an outer-periphery-side direction of the disk.

* * * * *